(12) United States Patent
Inagaki

(10) Patent No.: US 11,417,123 B2
(45) Date of Patent: Aug. 16, 2022

(54) DRIVING STATE MONITORING DEVICE, DRIVING STATE MONITORING SYSTEM, DRIVING STATE MONITORING METHOD, AND RECORDING MEDIUM

(71) Applicant: NEC CORPORATION, Tokyo (JP)

(72) Inventor: Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,814

(22) PCT Filed: Jan. 11, 2019

(86) PCT No.: PCT/JP2019/000782
§ 371 (c)(1),
(2) Date: Jul. 24, 2020

(87) PCT Pub. No.: WO2019/146435
PCT Pub. Date: Aug. 1, 2019

(65) Prior Publication Data
US 2021/0056330 A1 Feb. 25, 2021

(30) Foreign Application Priority Data
Jan. 25, 2018 (JP) .............................. JP2018-010902

(51) Int. Cl.
*G06V 20/59* (2022.01)
*B60Q 9/00* (2006.01)

(52) U.S. Cl.
CPC ............. *G06V 20/597* (2022.01); *B60Q 9/00* (2013.01)

(58) Field of Classification Search
CPC .............................. G06K 9/00845; B60Q 9/00
See application file for complete search history.

(56) References Cited

U.S. PATENT DOCUMENTS

2014/0070934 A1* 3/2014 Chau ...................... B60K 37/00
340/438
2017/0001648 A1* 1/2017 An ......................... B60W 40/09
(Continued)

FOREIGN PATENT DOCUMENTS

JP          2005-267108 A      9/2005
JP          2008-250775 A     10/2008
(Continued)

OTHER PUBLICATIONS

International Search Report for PCT/JP2019/000782 dated Apr. 16, 2019 (PCT/ISA/210).

*Primary Examiner* — Omer S Khan
(74) *Attorney, Agent, or Firm* — Sughrue Mion, PLLC

(57) ABSTRACT

A driving state monitoring device includes: an acquisition unit that acquires line-of-sight information indicating a line-of-sight of a driver and driving state information indicating a state of driving by the driver; a calculation unit that calculates a line-of-sight range of the driver in a predetermined driving state based on the line-of-sight information and the driving state information; and a determination unit that determines an insufficient visual observation range based on a recommended line-of-sight range and the line-of-sight range of the driver, the insufficient visual observation range being a range in which visual observation by the driver is insufficient, the recommended line-of-sight range being a line-of-sight range recommended for the predetermined driving state.

8 Claims, 9 Drawing Sheets

(56) References Cited

U.S. PATENT DOCUMENTS

| | | | | |
|---|---|---|---|---|
| 2017/0015248 A1* | 1/2017 | Baur | ............................ | B60R 1/00 |
| 2017/0330042 A1* | 11/2017 | Vaziri | .................. | G06K 9/00604 |
| 2019/0039628 A1* | 2/2019 | Mizuno | .................. | B60W 50/14 |
| 2019/0071029 A1* | 3/2019 | Choi | ........................ | B60R 11/04 |

FOREIGN PATENT DOCUMENTS

| | | |
|---|---|---|
| JP | 2013-242763 A | 12/2013 |
| WO | 2015/064080 A | 5/2015 |
| WO | 2016/166791 A1 | 10/2016 |

* cited by examiner

DRIVING STATE MONITORING DEVICE, DRIVING STATE MONITORING SYSTEM, DRIVING STATE MONITORING METHOD, AND RECORDING MEDIUM

CROSS REFERENCE TO RELATED APPLICATIONS

This application is a National Stage of International Application No. PCT/JP2019/000782 filed Jan. 11, 2019, claiming priority based on Japanese Patent Application No. 2018-010902, filed Jan. 25, 2018 the entire disclosures of which are incorporated herein by reference.

TECHNICAL FIELD

The present invention relates to a driving state monitoring device, a driving state monitoring system, a driving state monitoring method, and a recording medium.

BACKGROUND ART

Patent Document 1 discloses a technique of obtaining a region in which a driver's ideal line-of-sight distribution does not overlap with an actual line-of-sight distribution when driving a vehicle, and then displaying information that specifies this region, as safe driving support information.

PRIOR ART DOCUMENTS

Patent Document

[Patent Document 1] PCT International Publication No. WO 2016/166791

SUMMARY OF THE INVENTION

Problem to be Solved by the Invention

When driving a moving body such as a vehicle, a ship, or an aircraft, in addition to the visually observed space in front of such as a windscreen or the like, a wider area such as the rear also needs to be visually observed according to the driving state. Further, a technique which enables a driver himself or herself to more appropriately recognize an insufficient line-of-sight range corresponding to the driving state is sought.

An example object of the present invention is to provide a driving state monitoring device, a driving state monitoring system, a driving state monitoring method, and a recording medium that solve the problem described above.

Means for Solving the Problem

According to a first aspect of the present invention, a driving state monitoring device includes: an acquisition unit that acquires line-of-sight information indicating a line-of-sight of a driver and driving state information indicating a state of driving by the driver; a calculation unit that calculates a line-of-sight range of the driver in a predetermined driving state based on the line-of-sight information and the driving state information; and a determination unit that determines an insufficient visual observation range based on a recommended line-of-sight range and the line-of-sight range of the driver, the insufficient visual observation range being a range in which visual observation by the driver is insufficient, the recommended line-of-sight range being a line-of-sight range recommended for the predetermined driving state.

According to a second example aspect of the present invention, a driving state monitoring system includes: a driving state monitoring device; and a driving state sensing device. The driving state sensing device acquires line-of-sight information indicating a line-of-sight of a driver and driving state information indicating a state of driving by the driver. The driving state monitoring device includes: an acquisition unit that acquires the line-of-sight information and the driving state information from the driving state sensing device; a calculation unit that calculates a line-of-sight range of the driver in a predetermined driving state based on the line-of-sight information and the driving state information; and a determination unit that determines an insufficient visual observation range based on a recommended line-of-sight range and the line-of-sight range of the driver, the insufficient visual observation range being a range in which visual observation by the driver is insufficient, the recommended line-of-sight range being a line-of-sight range recommended for the predetermined driving state.

According to a third example aspect of the present invention, a driving state monitoring method includes: acquiring line-of-sight information indicating a line-of-sight of a driver and driving state information indicating a state of driving by the driver; calculating a line-of-sight range of the driver in a predetermined driving state based on the line-of-sight information and the driving state information; and determining an insufficient visual observation range based on a recommended line-of-sight range and the line-of-sight range of the driver, the insufficient visual observation range being a range in which visual observation by the driver is insufficient, the recommended line-of-sight range being a line-of-sight range recommended for the predetermined driving state.

According to a fourth example aspect of the present invention, a recording medium that stores a program that causes a computer to execute: acquiring line-of-sight information indicating a line-of-sight of a driver and driving state information indicating a state of driving by the driver; calculating a line-of-sight range of the driver in a predetermined driving state based on the line-of-sight information and the driving state information; and determining an insufficient visual observation range based on a recommended line-of-sight range and the line-of-sight range of the driver, the insufficient visual observation range being a range in which visual observation by the driver is insufficient, the recommended line-of-sight range being a line-of-sight range recommended for the predetermined driving state.

Effect of the Invention

According to an example embodiment of the present invention, a driver himself or herself can more appropriately recognize an insufficient line-of-sight range corresponding to the driving state.

EXAMPLE EMBODIMENTS FOR CARRYING OUT THE INVENTION

Hereunder, a driving state monitoring device according to example embodiments of the present invention will be described with reference to the drawings.

Figure 1:
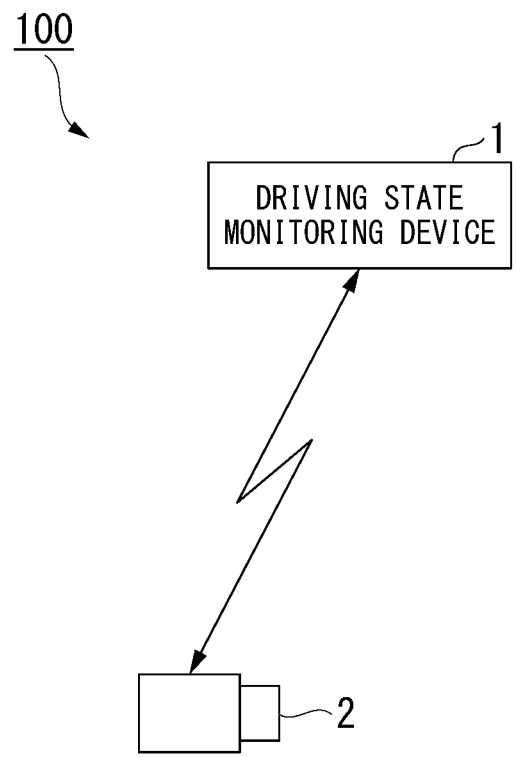
FIG. 1 is a diagram showing a driving state monitoring system according to an example embodiment of the present invention.

FIG. 1 is a diagram showing a driving state monitoring system according to an example embodiment of the present invention.

As shown in FIG. 1, the driving state monitoring system 100 includes a driving state monitoring device 1, and a drive recorder 2, which is one form of a driving state sensing device. The driving state monitoring device 1 and the drive recorder 2 are connected via a wireless communication network or a wired communication network. The driving state monitoring device 1 may be a device provided in a moving body such as a car, a ship, or an aircraft. The driving state monitoring device 1 may be configured as a server device installed at a remote site which is separated from the moving body. The drive recorder 2 is provided inside the moving body. Hereunder, a case where the moving body is a vehicle will be described.

Figure 2:
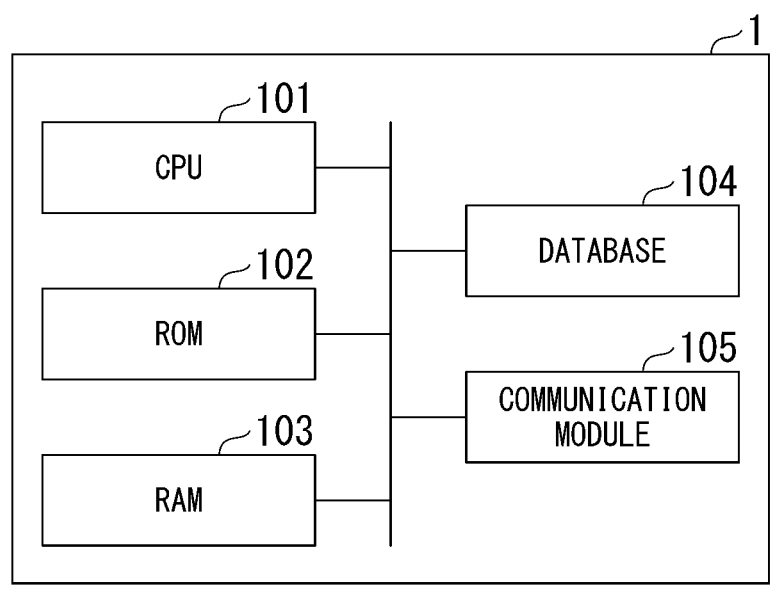
FIG. 2 is a hardware configuration diagram of a driving state monitoring device according to the example embodiment of the present invention.

FIG. 2 is a hardware configuration diagram of the driving state monitoring device.

As shown in the figure, the driving state monitoring device 1 is a computer including hardware such as a CPU (Central Processing Unit) 101, a ROM (Read Only Memory) 102, a RAM (Random Access Memory) 103, a database 104, and a communication module 105.

Figure 3:
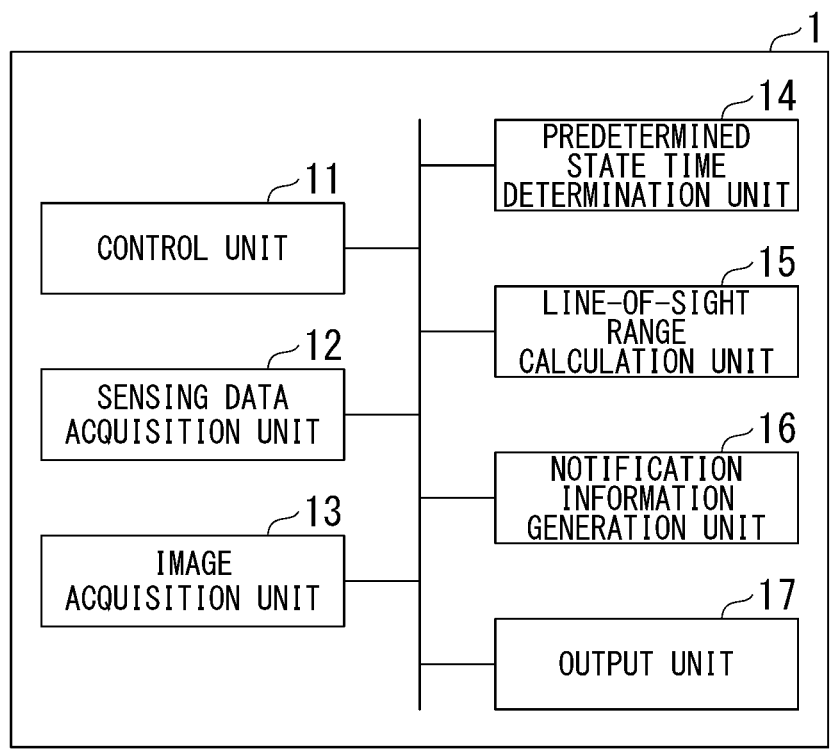
FIG. 3 is a functional block diagram of the driving state monitoring device according to the example embodiment of the present invention.

FIG. 3 is a functional block diagram of the driving state monitoring device.

The driving state monitoring device 1 is activated when the power is turned on, and executes a driving state monitoring program recorded in advance. As a result, the driving state monitoring device 1 is capable of executing the functions of a control unit 11, a sensing data acquisition unit 12, an image acquisition unit 13, a predetermined state time determination unit (specification unit) 14, a line-of-sight range calculation unit 15, a notification information generation unit 16, and an output unit 17.

The control unit 11 controls each of the functional units of the driving state monitoring device 1.

The sensing data acquisition unit 12 acquires driving state data which includes a plurality of items relating to the driving states.

The image acquisition unit 13 acquires a captured image which has been captured by the drive recorder 2.

The predetermined state time determination unit 14 determines the time of a predetermined driving state on the basis of driving state information. In the example embodiment, the time of a predetermined driving state is the time of a right turn, the time of a left turn, the time of reverse driving, and the like.

The line-of-sight range calculation unit 15 calculates, on the basis of line-of-sight information at the time of driving, a driver's line-of-sight range corresponding to the driving state information which indicates the predetermined driving state.

The notification information generation unit 16 determines an insufficient visual observation range (insufficient visual observation line-of-sight range) on the basis of a recommended line-of-sight range, which is stored in advance for the predetermined driving state, and the driver's line-of-sight range. The notification information generation unit 16 may calculate an insufficient visual observation line-of-sight range for each of a plurality of occurrences of the predetermined driving state, and determine the insufficient visual observation range on the basis of statistical information for the plurality of calculated insufficient visual observation line-of-sight ranges. As an example, the notification information generation unit 16 generates notification information, which includes image information that enables at least the recommended line-of-sight range and the insufficient visual observation range obtained on the basis of the statistical information to be visually observed.

The output unit 17 outputs the notification information.

Figure 4:
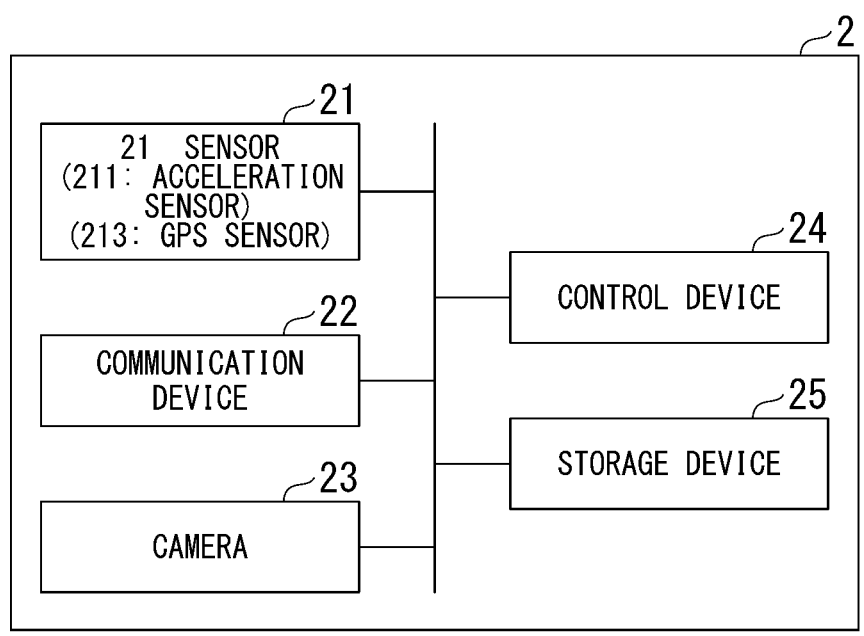
FIG. 4 is a diagram showing a hardware configuration of a drive recorder according to the example embodiment of the present invention.

FIG. 4 is a diagram showing a hardware configuration of the drive recorder.

The drive recorder 2 is configured by including a sensor 21, a communication device 22, a camera 23, a control device 24, a storage device 25, and the like. The sensor 21 may be an acceleration sensor 211, a GPS sensor 213, and the like. These sensors 21 may be installed in the vehicle and outside the drive recorder 2, and the drive recorder 2 may acquire the information sensed by the sensors 21.

The communication device 22 is communicably connected to the driving state monitoring device 1. The camera 23 generates a captured image that captures the outside or the inside of the vehicle. The control device 24 controls the functions of the drive recorder 2. The recording medium 25 stores the captured image and various information sensed by the sensors 21. The control device 24 of the drive recorder 2 is a computer including a CPU, a ROM, a RAM, and the like.

Figure 5:
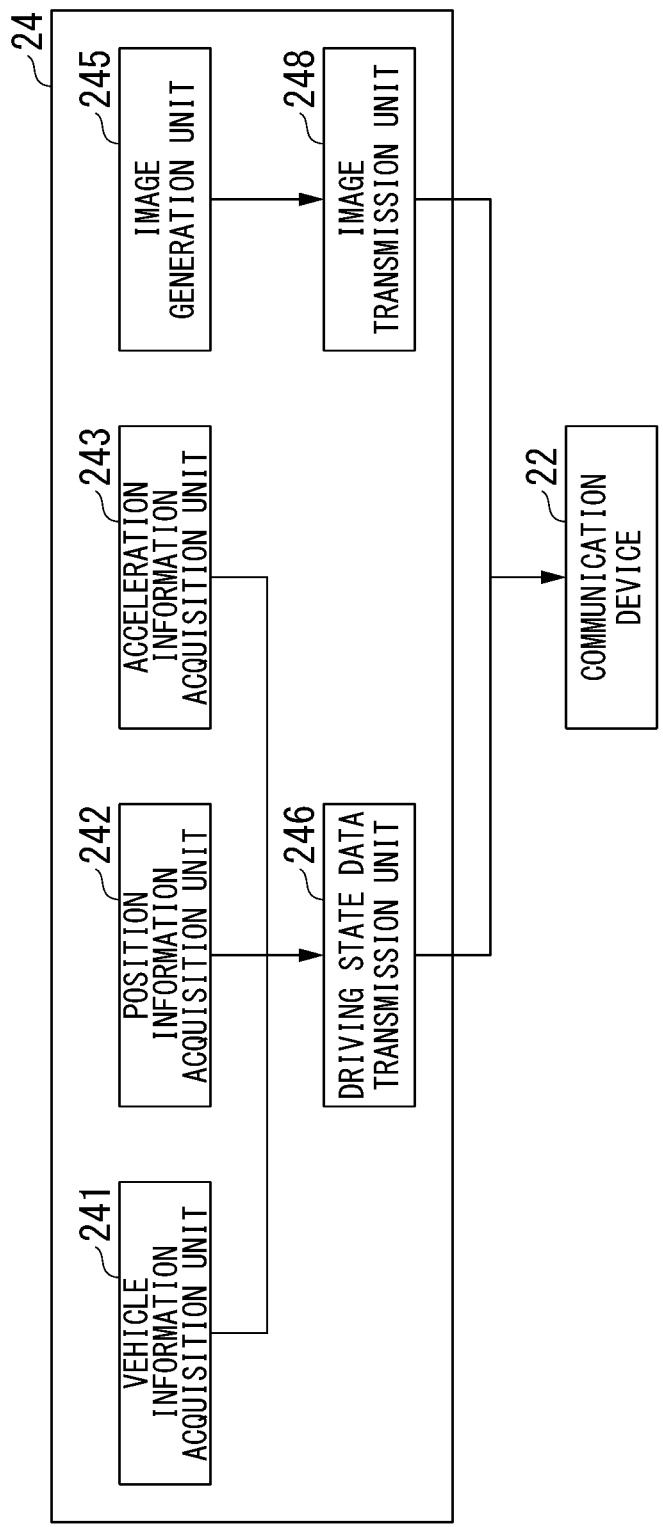
FIG. 5 is a functional block diagram of a control device of the drive recorder according to the example embodiment of the present invention.

FIG. 5 is a functional block diagram of the control device included in the drive recorder.

The control device 24 executes a control program when the drive recorder is activated. As a result, the control device 24 is capable of executing the functions of a vehicle information acquisition unit 241, a position information acquisition unit 242, an acceleration information acquisition unit 243, an image generation unit 245, a driving state data transmission unit 246, and an image transmission unit 248.

The vehicle information acquisition unit 241 acquires information (a driver ID, a vehicle type, and a vehicle ID) recorded on a memory inserted into the drive recorder, and other information such as the vehicle acceleration. Further, the vehicle information acquisition unit 241 acquires vehicle information, which is information different from the position information, wherein the vehicle information includes sensing information acquired from the sensors installed on the vehicle. The information capable of being obtained by the vehicle information acquisition unit 241 may include information such as the driving start time, the driving end time, the vehicle speed corresponding to the time and vehicle interior temperature.

The position information acquisition unit 242 acquires information of the position (latitude and longitude) of the vehicle corresponding to the time from a GPS sensor 213 or the like.

The acceleration information acquisition unit 243 acquires information of the acceleration of the vehicle corresponding to the time from an acceleration sensor 211 or the like.

The image generation unit 245 generates a captured image by acquiring from the camera 23, a captured data image that has been captured by the camera 23.

The driving state data transmission unit 246 transmits driving state data, which includes at least the vehicle information, the position information, and the acceleration information, to the driving state monitoring device 1.

The image transmission unit 248 transmits the captured image generated by the image generation unit 245, to the driving state monitoring device 1.

Figure 6:
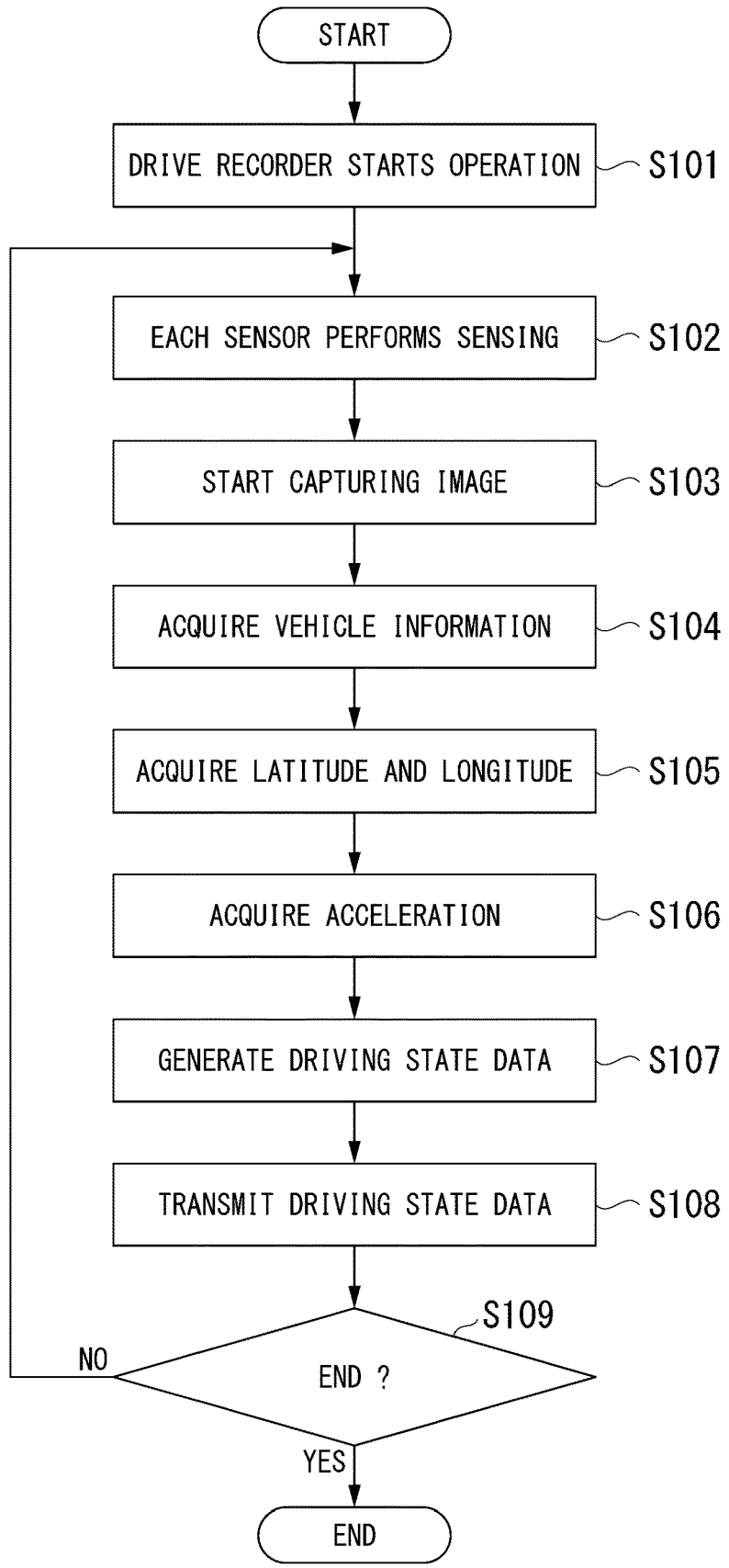
FIG. 6 is a first diagram showing a processing flow of the drive recorder according to the example embodiment of the present invention.

FIG. 6 is a first diagram showing a processing flow of the drive recorder.

Next, the processing flow of the driving state monitoring system will be described step by step.

First, the driving state data transmission processing in the drive recorder 2 will be described.

When the electrical system of the vehicle is activated, operation of the drive recorder 2 is started (step S101). Each of the sensors 21 of the drive recorder 2 starts to perform various sensing after the drive recorder 2 is started (step S102). The camera 23 also starts capturing an image (step S103). Then, while the drive recorder 2 is operating, the vehicle information acquisition unit 241 of the control device 24 acquires vehicle information (step S104). The vehicle information acquisition unit 241 may repeatedly acquire the sensing information included in the vehicle information at predetermined time intervals. The position information acquisition unit 242 acquires the latitude and longitude from the GPS sensor 213 at predetermined time intervals (step S105). The acceleration information acquisition unit 243 acquires the acceleration from the acceleration sensor 211 at predetermined time intervals (step S106). The predetermined time interval may be, for example, every 0.1 seconds. The driving state data transmission unit 246 acquires the vehicle information, the position information (latitude and longitude), and the acceleration. The driving state data transmission unit 246 generates driving state data, which includes the acquired information, the time of generation of the driving state data, the ID of the drive recorder 2, and a driver ID (step S107). The driving state data transmission unit 246 requests the communication device 22 to transmit the driving state data to the driving state monitoring device 1. The communication device 22 transmits the driving state data to the driving state monitoring device 1 (step S108). The control device 24 determines whether or not the processing has ended (step S109), and repeats the processing from step S102 until the processing ends.

Figure 7:
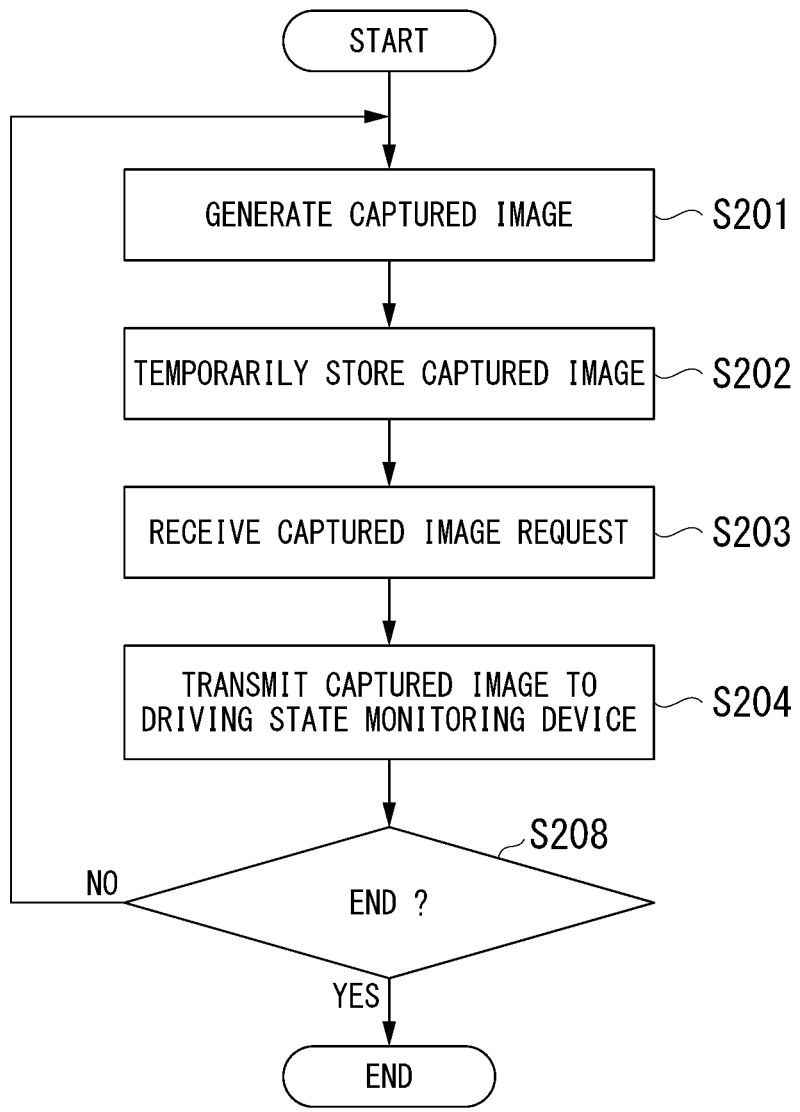
FIG. 7 is a second diagram showing a processing flow of the drive recorder according to the example embodiment of the present invention.

FIG. 7 is a second diagram showing a processing flow of the drive recorder.

The drive recorder 2 performs captured image transmission processing in parallel with the driving state data transmission processing. First, when the drive recorder 2 is started, the image generation unit 245 of the control device 24 acquires captured image data from the camera 23, and generates a captured image which includes the ID of the drive recorder 2 and the driver ID (step S201). The image generation unit 245 outputs the captured image to the image transmission unit 248. The image transmission unit 248 temporarily stores the captured image (step S202). The image transmission unit 248 receives a captured image request from the driving state monitoring device 1 (step S203). In response to receiving the captured image request, the image transmission unit 248 transmits the captured image that was temporarily stored when restart was performed, to the driving state monitoring device 1 after receiving the captured image request (step S204). The image transmission unit 248 may periodically transmit an obtained captured image to the driving state monitoring device 1. Alternatively, the image transmission unit 248 may transmit captured images to the driving state monitoring device 1 by streaming processing. The control device 24 determines whether or not to end the processing (step S205). The control device 24 repeats the processing of steps S201 to S205 during the operation of the drive recorder 2.

Figure 8:
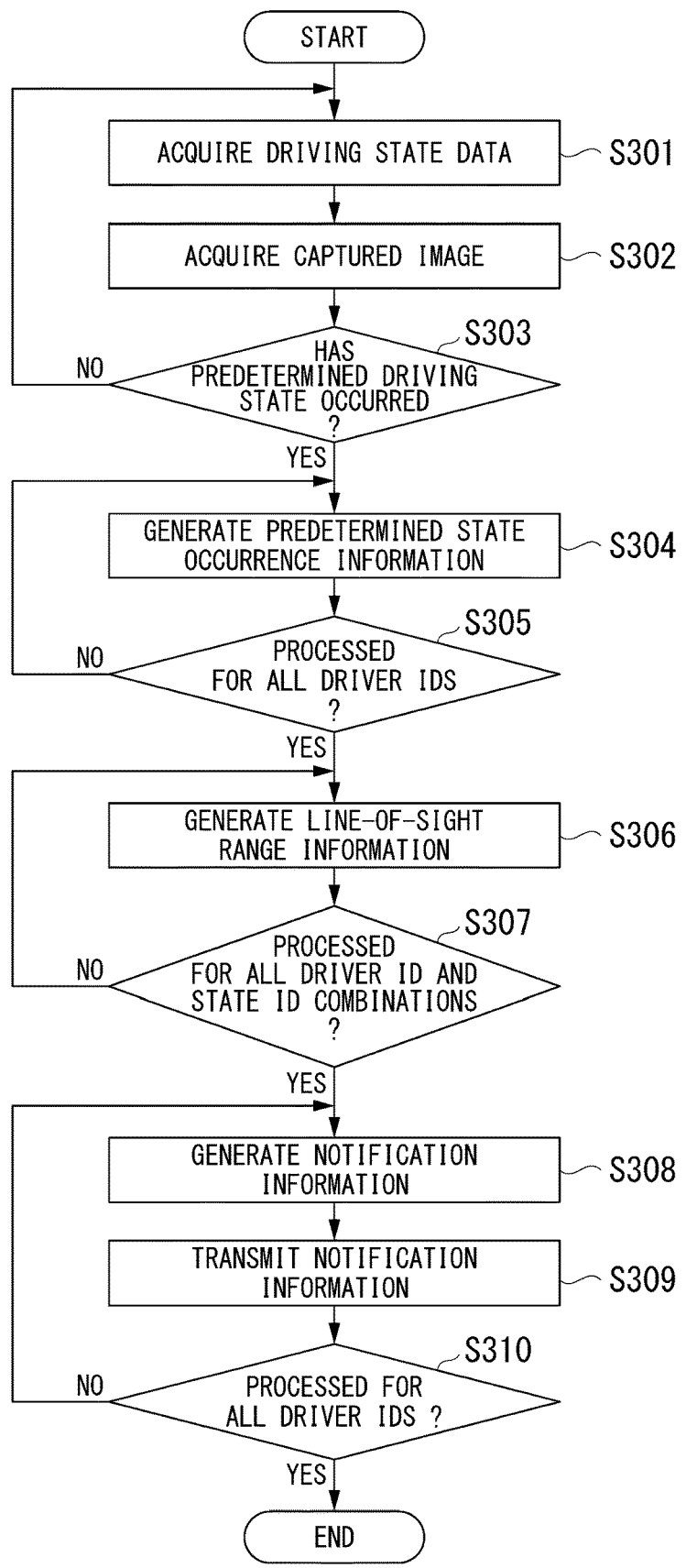
FIG. 8 is a diagram showing a processing flow of the driving state monitoring device according to the example embodiment of the present invention.

FIG. 8 is a diagram showing a processing flow of the driving state monitoring device.

In the driving state monitoring device 1, the sensing data acquisition unit 12 acquires the driving state data transmitted by the communication device 22 of the drive recorder 2 via the communication module 105 (step S301). The sensing data acquisition unit 12 reads the ID of the drive recorder 2 and the driver ID included in the driving state data. The sensing data acquisition unit 12 stores the driving state data in the database 104 in association with the ID of the drive recorder 2 and the driver ID. The sensing data acquisition unit 12 repeats this processing.

The image acquisition unit 13 acquires the captured image transmitted by the communication device 22 of the drive recorder 2 via the communication module 105 (step S302). The image acquisition unit 13 reads the ID of the drive recorder 2 or the driver ID included in the captured image. The image acquisition unit 13 stores the captured image in the database 104 in association with the ID of the drive recorder 2 or the driver ID. The image acquisition unit 13 repeats this processing.

The predetermined state time determination unit 14 acquires the driving state data recorded in the database 104 which is associated with the driver ID of a certain driver at predetermined intervals. The predetermined state time determination unit 14 determines whether or not a predetermined driving state has occurred at predetermined intervals on the basis of the sensing information obtained from the driving state data (step S303). For example, the predetermined state time determination unit 14 determines whether or not a predetermined driving state such as a left turn, a right turn, or reversing of the vehicle has occurred based on the acceleration in each axis direction of a three-dimensional coordinate space. The predetermined state time determination unit 14 may determine whether or not the state of the vehicle is a predetermined driving state on the basis of a combination of the acceleration information and information other than the acceleration, such as information of the steering wheel angle, the current setting position of operators such as levers, the brake pressure, or the state of the direction indicator.

When the predetermined state time determination unit 14 detects that the vehicle is in a predetermined state based on the acceleration, it detects the time in which the vehicle entered the predetermined state. For example, if the acceleration included in the driving state data is associated with time information, the predetermined state time determination unit 14 reads the time information associated with the acceleration used in determining the predetermined state, and detects the time as the time that the vehicle entered the predetermined state. The predetermined state time determination unit 14 generates predetermined state occurrence information, which includes a state ID indicating the predetermined driving state of the vehicle, the time that the state occurred, and a driver ID (step S304). The predetermined state time determination unit 14 records the generated predetermined state occurrence information in the database 104. The predetermined state time determination unit 14 determines whether or not predetermined state occurrence information has been generated for all driver IDs (step S305). The predetermined state time determination unit 14 repeats the processing until generation of predetermined state occurrence information is completed for all driver IDs.

The line-of-sight range calculation unit 15 generates line-of-sight range information for each driver ID for each predetermined period, such as one month (step S306). Specifically, the line-of-sight range calculation unit 15 reads the predetermined state occurrence information associated with a certain driver ID from the database 104. The line-of-sight range calculation unit 15 reads the state ID and the occurrence time of the state indicated by the state ID included in the predetermined state occurrence information. The line-of-sight range calculation unit 15 acquires a captured image recorded in the database 104 associated with the driver ID, which is a captured image that includes the occurrence time of the state indicated by the state ID. The line-of-sight range calculation unit 15 calculates the start time and the end time of the predetermined state occurrence time based on the occurrence time in the frame images of the captured image. For example, the line-of-sight range calculation unit 15 calculates the occurrence time of the predetermined state occurrence time as the start time, and the time obtained by adding 10 seconds to the occurrence time as the end time. This calculation of the start time and the end time of the predetermined state occurrence time is an example, and the start and end times may be calculated by different calculation methods for each state indicated by the state IDs.

The line-of-sight range calculation unit 15 acquires, from among the frame images in the captured image, a plurality of frame images in the period from the start time to the end time of the state occurrence time. The line-of-sight range calculation unit 15 calculates, for the driver appearing in the frame images, a face orientation vector with the front direction serving as a reference, and a pupil orientation vector of the eyeball with the front direction serving as a reference. As an example, the face orientation vector and the pupil orientation vector represent any angle (direction) in a 360-degree range in the horizontal direction centered on the driver's head position (for example, a range of −180 degrees to 180 degrees when the front direction is 0 degrees). The line-of-sight range calculation unit 15 calculates a line-of-sight direction vector, which represents a composite vector of the face orientation vector and the pupil orientation vector. The line-of-sight range calculation unit 15 repeatedly calculates a line-of-sight direction vector for each of the frame images in the period from the start time to the end time of the state occurrence time. The line-of-sight range calculation unit 15 calculates a driver's line-of-sight range, which includes the range of the line-of-sight direction vectors of each of the frame images. The line-of-sight range calculation unit 15 records line-of-sight range information, which includes the state ID, the driver ID, and the driver's line-of-sight range, in the database 104. The line-of-sight range calculation unit 15 determines whether or not line-of-sight range information has been generated for all driver ID and state ID combinations (step S307). The line-of-sight range calculation unit 15 repeats the processing until the generation of line-of-sight range information is completed for all driver ID and state ID combinations. When the processing is completed, the line-of-sight range calculation unit 15 instructs the notification information generation unit 16 to generate notification information.

The notification information generation unit 16 generates notification information on the basis of the notification information generation instruction (step S308). Specifically, the notification information generation unit 16 reads the line-of-sight range information of a certain driver ID from the database 104. The notification information generation unit 16 specifies, from among the read line-of-sight range information, the line-of-sight range information which includes a single selected state ID. The notification information generation unit 16 extracts the driver's line-of-sight range from each piece of line-of-sight range information that includes the single selected state ID, and calculates a statistical value for the driver's line-of-sight range in the predetermined driving state indicated by the state ID. For example, the notification information generation unit 16 calculates as the statistical value a range that is included in the driver's line-of-sight ranges with a probability of at least a predetermined ratio, such as 50% or more, among the plurality of driver's line-of-sight ranges. The notification information generation unit 16 generates, for each driver ID and state ID combination, notification information which includes the driver ID, the state ID, and the statistical value of the driver's line-of-sight range. The notification information generation unit 16 generates a notification image based on the notification information. The notification image is image information which represents a recommended line-of-sight range that is recommended for the driving state indicated by the state ID, the driver's line-of-sight range (statistical value) for the state ID, and an insufficient visual observation range which indicates the range in the recommended line-of-sight range that does not overlap with the driver's line-of-sight range. The notification information generation unit 16 generates notification information which includes the notification image and transmits the notification information to an output destination such as an email address or a terminal device specified by the driver ID (step S309). The notification information generation unit 16 determines whether or not notification information has been generated and transmitted for all driver IDs (step S310). The notification information generation unit 16 repeats the processing until generation and transmission of notification information is completed for all driver IDs.

Figure 9:
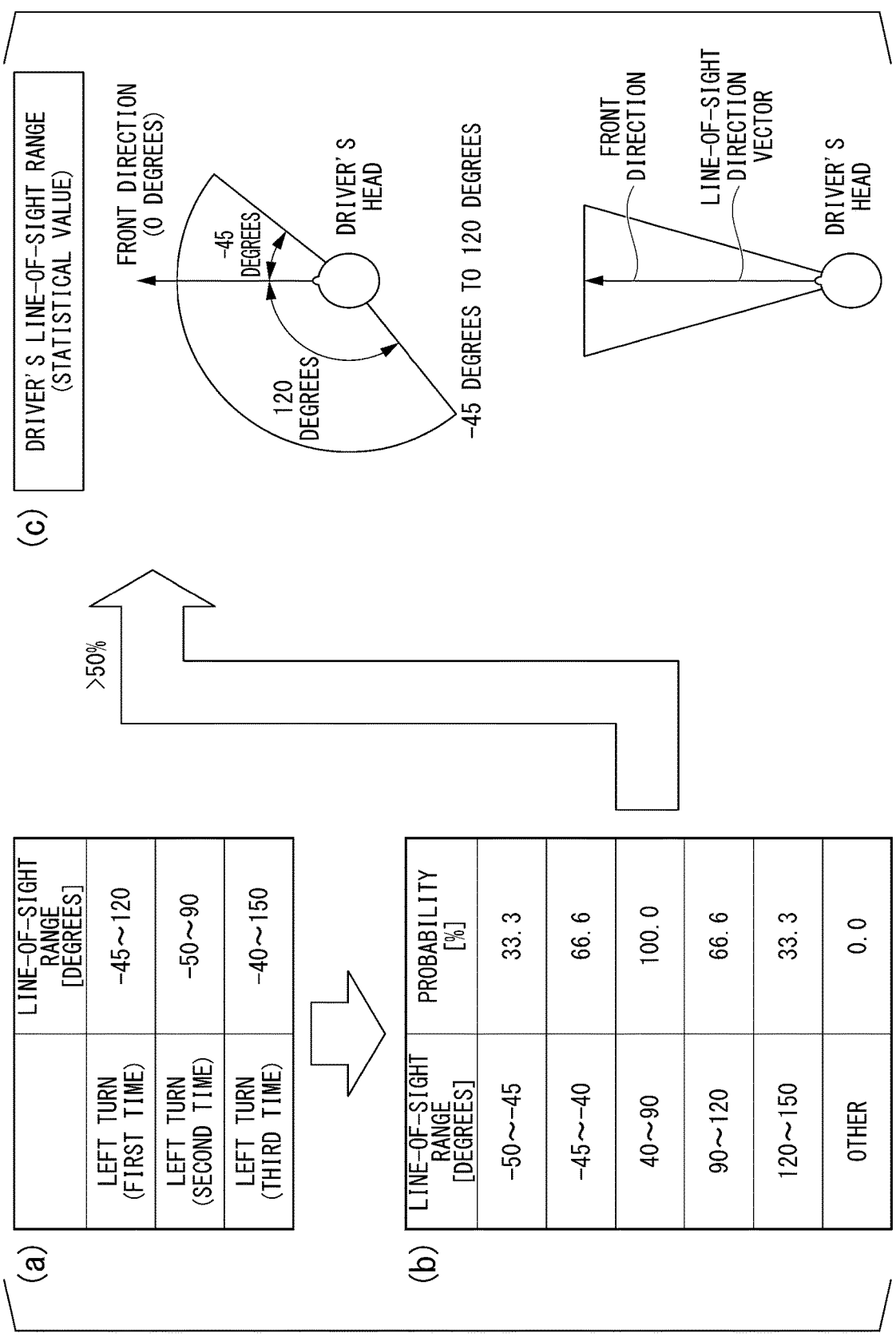
FIG. 9 is a diagram showing a summary of a statistical value calculation of a driver's line-of-sight range according to the example embodiment of the present invention.

FIG. 9 is a diagram showing a summary of a statistical value calculation of a driver's line-of-sight range.

The notification information generation unit 16 specifies, for example, three pieces of line-of-sight range information whose state ID represents a left turn. In the example shown in section (a) of FIG. 9, three pieces of line-of-sight range information representing three left turns are shown. Specifically, the driver's line-of-sight range of the line-of-sight range information representing the first left turn indicates a range of −45 degrees to 120 degrees. The driver's line-of-sight range of the line-of-sight range information representing the second left turn indicates a range of −50 degrees to 90 degrees. The driver's line-of-sight range of the third left turn indicates a range of −45 degrees to 150 degrees. The driver's line-of-sight ranges indicate the ranges when the front direction is 0 degrees.

In the case of this example, as shown in section (b) of FIG. 9, of the three total times of the left turn driving state, the number of times the driver shifted the line-of-sight direction to a line-of-sight range of −50 degrees to −45 degrees (entire range) was twice, and therefore, the probability is 33.3%.

Similarly, of the three total times of the left turn driving state, the number of times the driver shifted the line-of-sight direction to a line-of-sight range of −45 degrees to 40 degrees was twice, and therefore, the probability is 66.6%.

Similarly, of the three total times of the left turn driving state, the number of times the driver shifted the line-of-sight direction to a line-of-sight range of 40 degrees to 90 degrees (front direction) was three times, and therefore, the probability is 100.0%.

Similarly, of the three total times of the left turn driving state, the number of times the driver shifted the line-of-sight direction to a line-of-sight range of 90 degrees to 120 degrees was twice, and therefore, the probability is 66.6%.

Similarly, of the three total times of the left turn driving state, the number of times the driver shifted the line-of-sight direction to a line-of-sight range of 120 degrees to 150 degrees was once, and therefore, the probability is 33.3%. The calculated values for the probability are shown up to the first decimal place.

Further, as shown in section (c) of FIG. 9, the notification information generation unit 16 determines, as the statistical value of the driver's line-of-sight range, a range (−45 degrees to 120 degrees) in which the probability is a predetermined threshold (50%) or more based on the probabilities of the line-of-sight direction being shifted to each of the line-of-sight ranges shown in section (b) of FIG. 9.

Figure 10A:
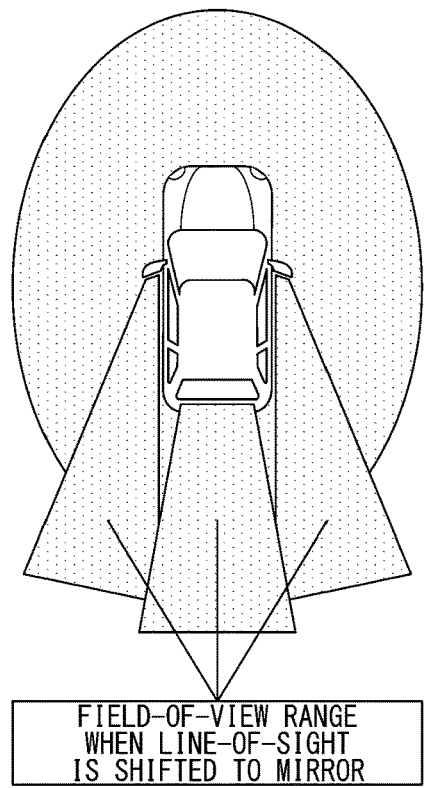
FIG. 10A is a diagram showing a summary of a notification image according to the example embodiment of the present invention.
Figure 10B:
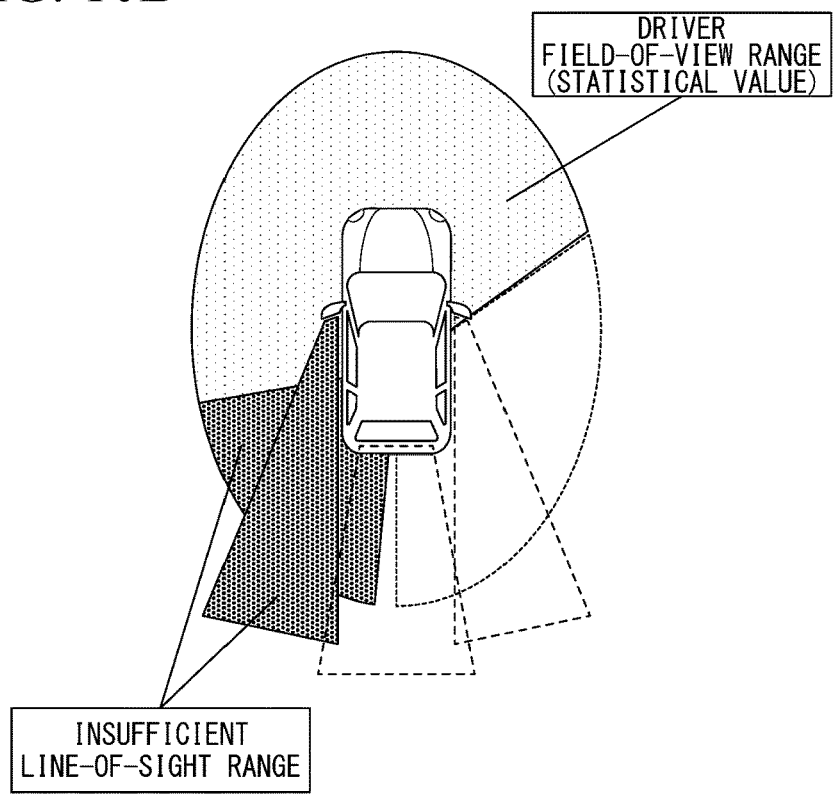
FIG. 10B is a diagram showing a summary of a notification image according to the example embodiment of the present invention.

FIGS. 10A and 10B are diagrams showing an outline of a notification image.

FIG. 10A is a diagram showing the entire line-of-sight range. In FIG. 10A, an image is shown in which, with the vehicle being arranged at the position of the driver's head, a line-of-sight range of 360 degrees around the vehicle and the line-of-sight ranges for cases where the driver shifts the line of sight to the door mirrors or the rearview mirror are indicated. When the driver's line-of-sight direction range includes the directions in which the door mirrors or the rearview mirror are located, the line-of-sight range information may include mirror IDs that represent the mirrors. In this case, the notification information generation unit 16 may include line-of-sight ranges that correspond to the mirror IDs in the driver's line-of-sight range. FIG. 10B shows an example of a notification image. As shown in FIG. 10B, the notification information generation unit 16 may calculate a statistical value of the driver's line-of-sight range and an insufficient visual observation range, and generate a notification image that depicts these ranges in different forms. The notification information generation unit 16 generates such a notification image for each predetermined driving state, and outputs the image so that it can be confirmed by a driver or an administrator thereof.

The example embodiment of the present invention has been described above. According to the processing of the driving state monitoring device described above, notification information is generated which includes an image that indicates the line-of-sight range and the insufficient visual observation range corresponding to the driving state. As a result, it is possible to provide a driver or an administrator thereof with information that enables the driver himself or herself to more appropriately recognize an insufficient line-of-sight range corresponding to the driving state.

Figure 11:
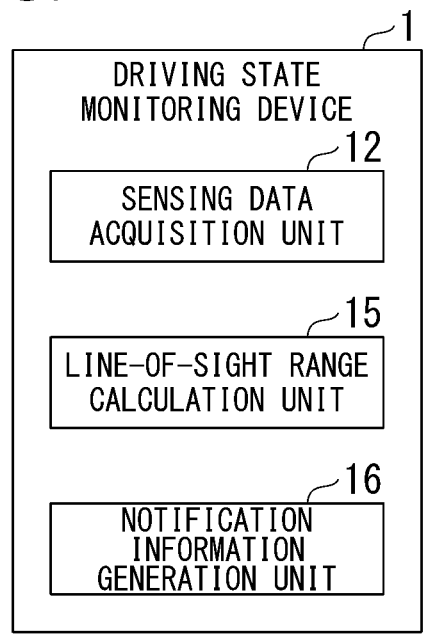
FIG. 11 is a diagram showing a driving state monitoring device according to another example embodiment of the present invention.

FIG. 11 is a diagram showing a driving state monitoring device according to another example embodiment of the present invention.

As shown in the figure, the driving state monitoring device 1 includes at least a sensing data acquisition unit 12, a line-of-sight range calculation unit (calculation unit) 15, and a notification information generation unit (determination unit) 16.

The sensing data acquisition unit 12 acquires a driver's line-of-sight information at the time of driving (line-of-sight information) and driving state data.

The line-of-sight range calculation unit 15 calculates, on the basis of the line-of-sight information at the time of driving, a driver's line-of-sight range corresponding to the driving state ID which indicates the predetermined driving state.

The notification information generation unit 16 determines an insufficient visual observation range on the basis of a recommended line-of-sight range, which is stored in advance for the predetermined driving state, and the driver's line-of-sight range.

The driving state monitoring device 1 and the control device 24 of the drive recorder 2 described above have an internal computer system. Further, the processing sequences described above are stored in a program format in a computer-readable recording medium, and the processing above is performed by a computer reading and executing the program.

The program described above may be for realizing some of the functions mentioned above. In addition, it may be one that realizes the functions mentioned above by being combined with a program already recorded on the computer system, as a so-called difference file (difference program).

INDUSTRIAL APPLICABILITY

The example embodiments of the present invention relate to a driving state monitoring device, a driving state monitoring system, a driving state monitoring method, and a recording medium.

REFERENCE SYMBOLS

1 Driving state monitoring device
2 Drive recorder
11 Control unit
12 Sensing data acquisition unit
13 Image acquisition unit
14 Predetermined state time determination unit
15 Line-of-sight range calculation unit
16 Notification information generation unit
17 Output unit
21 Sensor
22 Communication device
23 Camera
24 Control device
25 Storage device
211 Acceleration sensor
213 GPS sensor
241 Vehicle information acquisition unit
242 Position information acquisition unit 243 Acceleration information acquisition unit
245 Image generation unit
246 Driving state data transmission unit
248 Image transmission unit

The invention claimed is:

1. A driving state monitoring device comprising:
a memory configured to store instructions; and
a processor configured to execute the instructions to:
acquire line-of-sight information indicating driving state information indicating a state of driving by a driver, the line-of-sight information comprising images captured by an imaging device provided in a drive recorder, the driving state information being generated from information acquired by a sensor provided in the drive recorder;
calculate a line-of-sight range of the driver in at least one predetermined driving state based on the line-of-sight information and the driving state information;
determine an insufficient visual observation range as a range in a recommended line-of-sight range that does not overlap with the line-of-sight range of the driver, the insufficient visual observation range being a range in which visual observation by the driver is insufficient, the recommended line-of-sight range being a line-of-sight range recommended as the range in the at least one predetermined driving state;
generate notification information that includes an overhead image around a vehicle, the overhead image representing the recommended line-of-sight range, the line-of-sight range of the driver, and the insufficient visual observation range;
calculate, among a plurality of line-of-sight ranges of the driver, a range that is included in the line-of-sight ranges of the driver with a probability of at least a predetermined ratio, as a statistical value of the line-of-sight range of the driver;
generate, as the notification information, information that includes the overhead image and the statistical value; and
generate a notification image based on the notification information.

2. The driving state monitoring device according to claim 1,
wherein the processor is configured to execute the instructions to: determine time at which the at least one predetermined driving state occurred based on the driving state information,
wherein the line-of-sight information comprises a plurality of first captured images in which the driver is imaged, and
the calculating the line-of sight rage of the driver comprises acquiring, from the plurality of first captured images, a plurality of second captured images captured during a predetermined period with the specified time as a reference, and calculating the line-of-sight range of the driver based on the acquired plurality of second captured images.

3. The driving state monitoring device according to claim 1,
wherein the calculating the line-of-sight range of the driver comprises calculating the line-of-sight range of the driver for each of a plurality of predetermined driving states including the at least one predetermined driving state, and
the determining the insufficient visual observation range comprises calculating, for each of the predetermined driving states a statistical value of the line-of-sight range of the driver in each of the predetermined driving states, based on the line-of-sight range of the driver for each of the predetermined driving states, and determining, for each of the predetermined driving states, the insufficient visual observation range based on the calculated statistical value.

4. The driving state monitoring device according to claim 1, wherein the line-of-sight range of the driver includes a range that is visually observed through a mirror of the vehicle.

5. The driving state monitoring device according to claim 1, wherein the processor is configured to execute the instructions to generate the notification image that depicts the line-of-sight range of the driver and the insufficient visual observation range in different forms.

6. A driving state monitoring system comprising:
a driving state monitoring device; and
a driving state sensing device,
wherein the driving state sensing device comprises:
a memory configured to store instructions; and
a processor configured to execute the instructions stored in the memory of the driving state sensing device to:
acquire line-of-sight information indicating driving state information indicating a state of driving by a driver, the line-of-sight information comprising images captured by an imaging device provided in a drive recorder, the driving state information being generated from information acquired by a sensor provided in the drive recorder, and
the driving state monitoring device comprises:
a memory configured to store instructions; and
a processor configured to execute the instructions stored in the memory of the driving state monitoring device to:
acquire the line-of-sight information and the driving state information from the driving state sensing device;
calculate a line-of-sight range of the driver in at least one predetermined driving state based on the line-of-sight information and the driving state information;
determine an insufficient visual observation range as a range in a recommended line-of-sight range that does not overlap with the line-of-sight range of the driver, the insufficient visual observation range being a range in which visual observation by the driver is insufficient, the recommended line-of-sight range being a range recommended as the line-of-sight range in the at least one predetermined driving state;
generate notification information that includes an overhead image around a vehicle, the overhead image representing the recommended line-of-sight range, the line-of-sight range of the driver, and the insufficient visual observation range;
calculate, among a plurality of line-of-sight ranges of the driver, a range that is included in the line-of-sight ranges of the driver with a probability of at least a predetermined ratio, as a statistical value of the line-of-sight range of the driver;
generate, as the notification information, information that includes the overhead image and the statistical value; and
generate a notification image based on the notification information.

7. A driving state monitoring method comprising:

acquiring line-of-sight information indicating driving state information indicating a state of driving by a driver, the line-of-sight information comprising images captured by an imaging device provided in a drive recorder, the driving state information being generated from information acquired by a sensor provided in the drive recorder;

calculating a line-of-sight range of the driver in at least one predetermined driving state based on the line-of-sight information and the driving state information;

determining an insufficient visual observation range as a range in a recommended line-of-sight range that does not overlap with the line-of-sight range of the driver, the insufficient visual observation range being a range in which visual observation by the driver is insufficient, the recommended line-of-sight range being a range recommended as the line-of-sight range in the at least one predetermined driving state;

generating notification information that includes an overhead image around a vehicle, the overhead image representing the recommended line-of-sight range, the line-of-sight range of the driver, and the insufficient visual observation range;

calculating, among a plurality of line-of-sight ranges of the driver, a range that is included in the line-of-sight ranges of the driver with a probability of at least a predetermined ratio, as a statistical value of the line-of-sight range of the driver;

generating, as the notification information, information that includes the overhead image and the statistical value; and generating a notification image based on the notification information.

8. A non-transitory computer-readable recording medium that stores a program that causes a computer to execute:

acquiring line-of-sight information indicating driving state information indicating a state of driving by a driver, the line-of-sight information comprising images captured by an imaging device provided in a drive recorder, the driving state information being generated from information acquired by a sensor provided in the drive recorder;

calculating a line-of-sight range of the driver in at least one predetermined driving state based on the line-of-sight information and the driving state information;

determining an insufficient visual observation range as a range in a recommended line-of-sight range that does not overlap with the line-of-sight range of the driver, the insufficient visual observation range being a range in which visual observation by the driver is insufficient, the recommended line-of-sight range being a range recommended as the line-of-sight range in the at least one predetermined driving state;

generating notification information that includes an overhead image around a vehicle, the overhead image representing the recommended line-of-sight range, the line-of-sight range of the driver, and the insufficient visual observation range;

calculating, among a plurality of line-of-sight ranges of the driver, a range that is included in the line-of-sight ranges of the driver with a probability of at least a predetermined ratio, as a statistical value of the line-of-sight range of the driver;

generating, as the notification information, information that includes the overhead image and the statistical value; and generating a notification image based on the notification information.

* * * * *